United States Patent

[11] 3,596,534

| [72] | Inventor | John S. Logan |
| | | Dearborn, Mich. |
| [21] | Appl. No. | 819,590 |
| [22] | Filed | Apr. 28, 1969 |
| [45] | Patented | Aug. 3, 1971 |
| [73] | Assignee | Ford Motor Company |
| | | Dearborn, Mich. |

[54] POWER TRANSFER GEAR CASE
1 Claim, 5 Drawing Figs.

[52] U.S. Cl. ................................................ 74/665 T,
74/473, 192/48.8, 192/87.1
[51] Int. Cl. ....................................... F16h 37/06,
F16d 21/02
[50] Field of Search............................................ 192/48.8,
109, 8, 87.1; 74/665, 665 T, 473; 180/44

[56] References Cited
UNITED STATES PATENTS

| 2,084,887 | 6/1937 | Bennett..................... | 74/665 G1 |
| 2,397,587 | 4/1946 | Armantrout................. | 74/665 G1 |
| 2,933,947 | 4/1960 | Shawley et al............. | 74/473 X |
| 3,149,505 | 9/1964 | Burkhalter et al.......... | 74/665 I |
| 3,303,723 | 2/1967 | Ruf........................... | 74/665 IV |

FOREIGN PATENTS

| 1,251,481 | 12/1960 | France ......................... | 192/48.8 |
| 1,327,161 | 4/1963 | France ......................... | 74/665 I |

*Primary Examiner*—Carlton R. Croyle
*Assistant Examiner*—Thomas C. Perry
*Attorneys*—John R. Faulkner and Donald J. Harrington ABSTRACT: Torque transfer gearing for distributing driving torque from the power shaft of a main power transmission mechanism for a wheeled vehicle to each of two axle shafts, said gearing comprising a shiftable coupling for establishing and disestablishing a driving connection between a driven gear and each of the two drive shafts for the vehicle, said coupling comprising a clutch sleeve for drivably connecting the driven gear to the separate drive shafts regardless of the presence of driving torque on one of the drive shafts.

PATENTED AUG 3 1971

INVENTOR:
John S. Logan

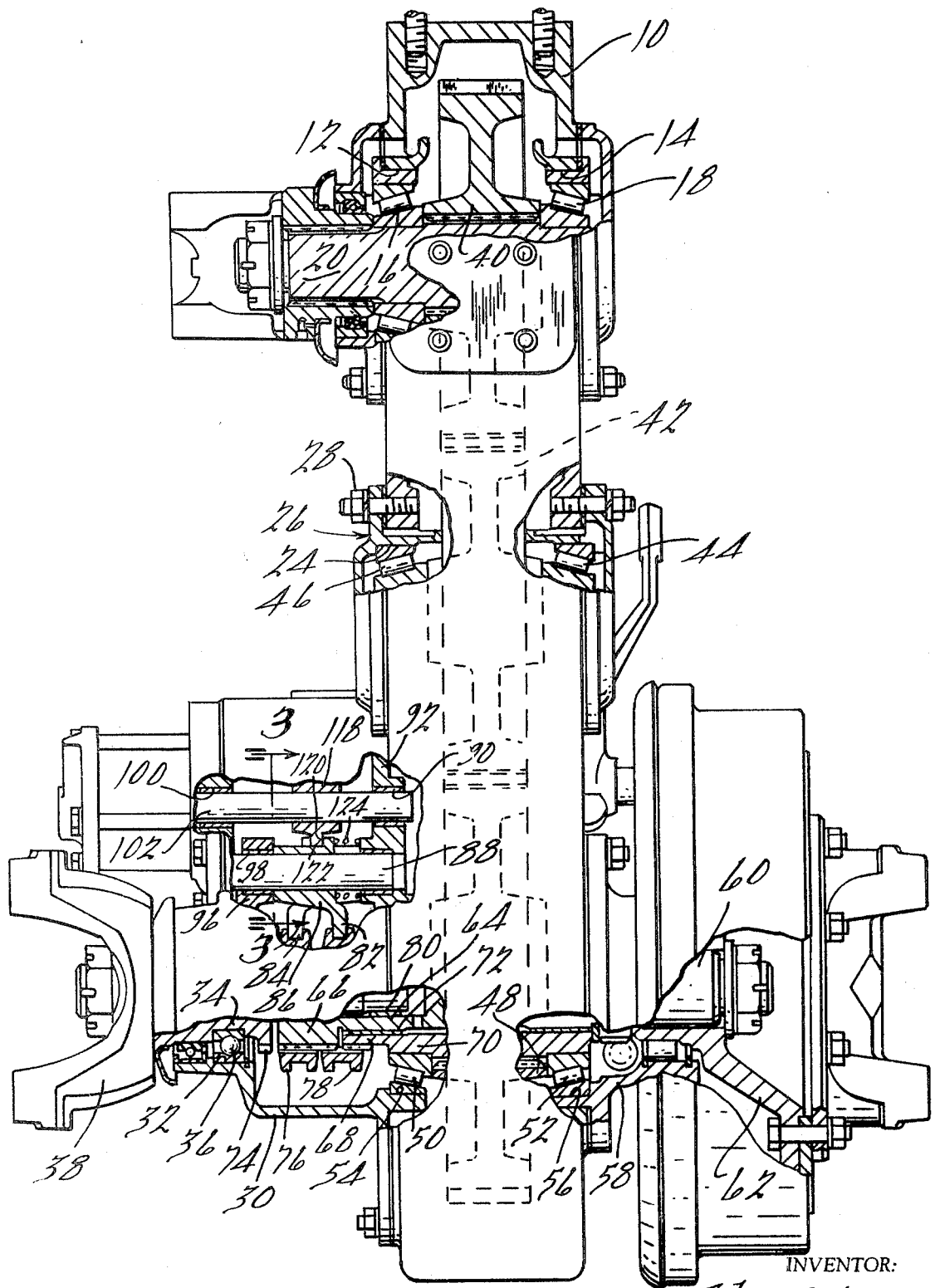

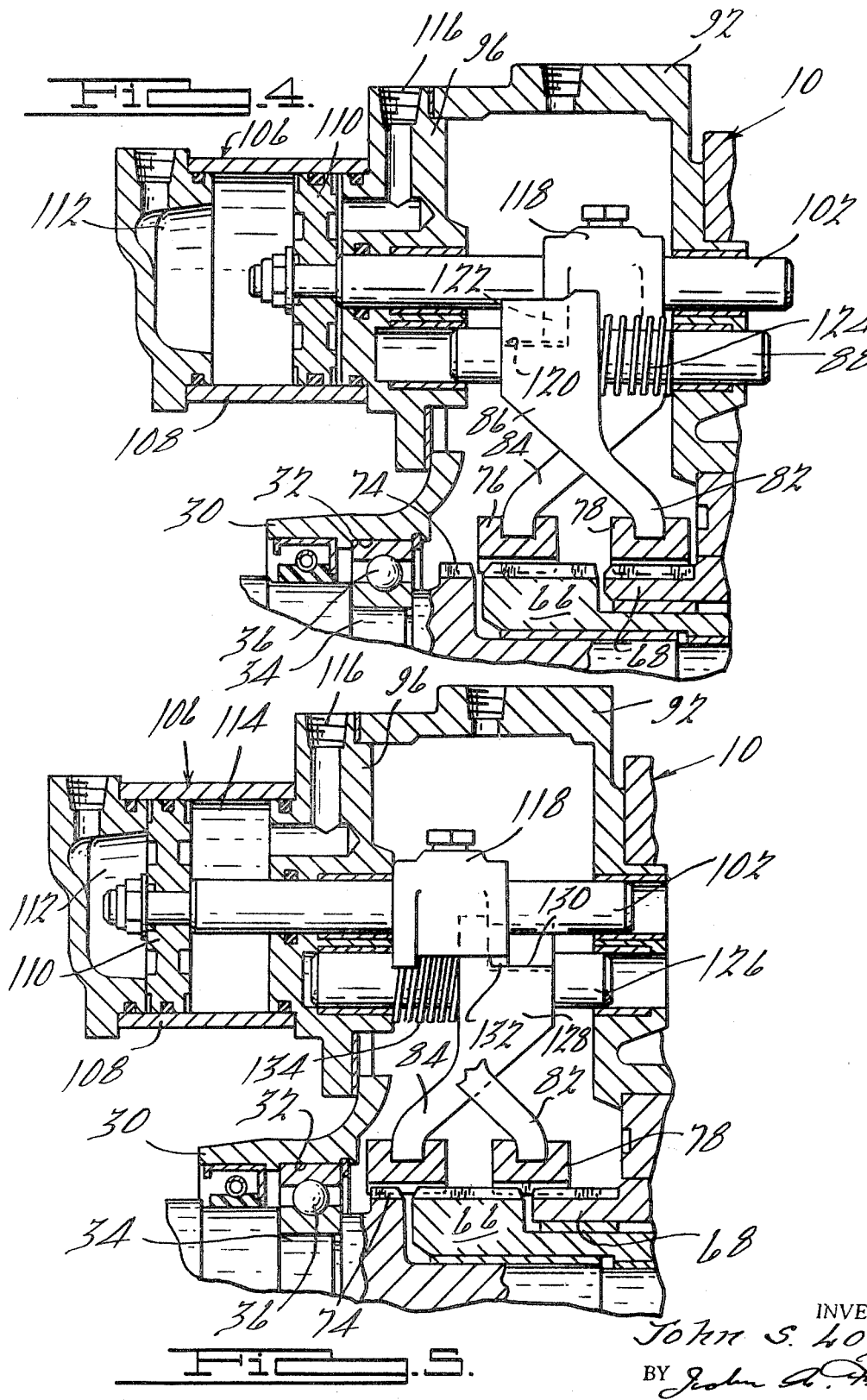

POWER TRANSFER GEAR CASE

GENERAL DESCRIPTION OF THE INVENTION

My invention relates generally to wheeled vehicles, such as four-wheel drive motor vehicles. It includes improvements in a driveline for such a vehicle in which provision is made for drivably connecting either the forward traction wheels of the vehicle or the rear traction wheels, or both, to the main driven shaft of a multiple ratio power transmission mechanism in the vehicle driveline.

My improved structure usually is identified by persons skilled in the art as a torque transfer gearcase. It includes a main driving gear that is connected drivably to a driven shaft of a multiple ratio transmission. Torque transfer gears connect the driving gear to the output gear of the transfer gearcase, the output gear serving as a driving element for each of two drive shafts extending from the transfer gearcase in opposite directions. One drive shaft is adapted to be coupled to the front differential-and-axle assembly of the mechanism, and the other is adapted to be connected to the rear differential-and-axle assembly.

In such arrangements, it is desirable to provide a coupling structure for connecting the output gear element of the transfer gearcase with either of the oppositely disposed drive shafts. An example of an environment of this type is disclosed in U.S. Pat. No. 3,149,505.

In transfer gearcases such as those disclosed in that patent, it is necessary to shift a coupling sleeve into positive engagement with clutch elements carried by one of the drive shafts. This establishes a driving connection between the driven gear and one of the drive shafts. In order to shift the clutch structure to establish a driving connection with the other drive shaft, it is necessary to move the clutch sleeve until a positive driving connection is established between the output gear of the transfer gearcase and the other drive shaft. The common coupling structure used to establish and disestablish these connections can be used also to establish a neutral condition, whereby the output gear element on the transfer gearcase is disconnected from both of the drive shafts.

It is difficult, if not impossible, in such structure to effect engagement of one of the drive shafts while torque is applied to the other drive shaft. It is necessary in such cases to relieve the torque before a shifting operation can be completed. Often it is difficult or impossible to do this, especially if the vehicle is positioned on a grade. In my improved structure this difficulty is overcome by a tandem shifting mechanism. It is not required that torque be interrupted in one output shaft while the other output shaft is engaged and disengaged. I have provided, also, in my improved structure, means for effecting a shift from a neutral condition to a driving condition for either one or both of the axles with a minimum shifting effort.

BRIEF DESCRIPTION OF THE FIGURES OF THE DRAWINGS

FIG. 2 is a partial cross-sectional view of the mechanism of FIG. 1, as seen from the plane of section line 2-2 of FIG. 1.

FIG. 4 is a view of a part of the FIG. 2 construction, with the shift mechanism in a neutral condition.

FIG. 5 is a view somewhat like FIG. 4, although it shows a shift mechanism in a position effecting a driving condition for both drive shafts.

PARTICULAR DESCRIPTION OF THE INVENTION

Figure 1:
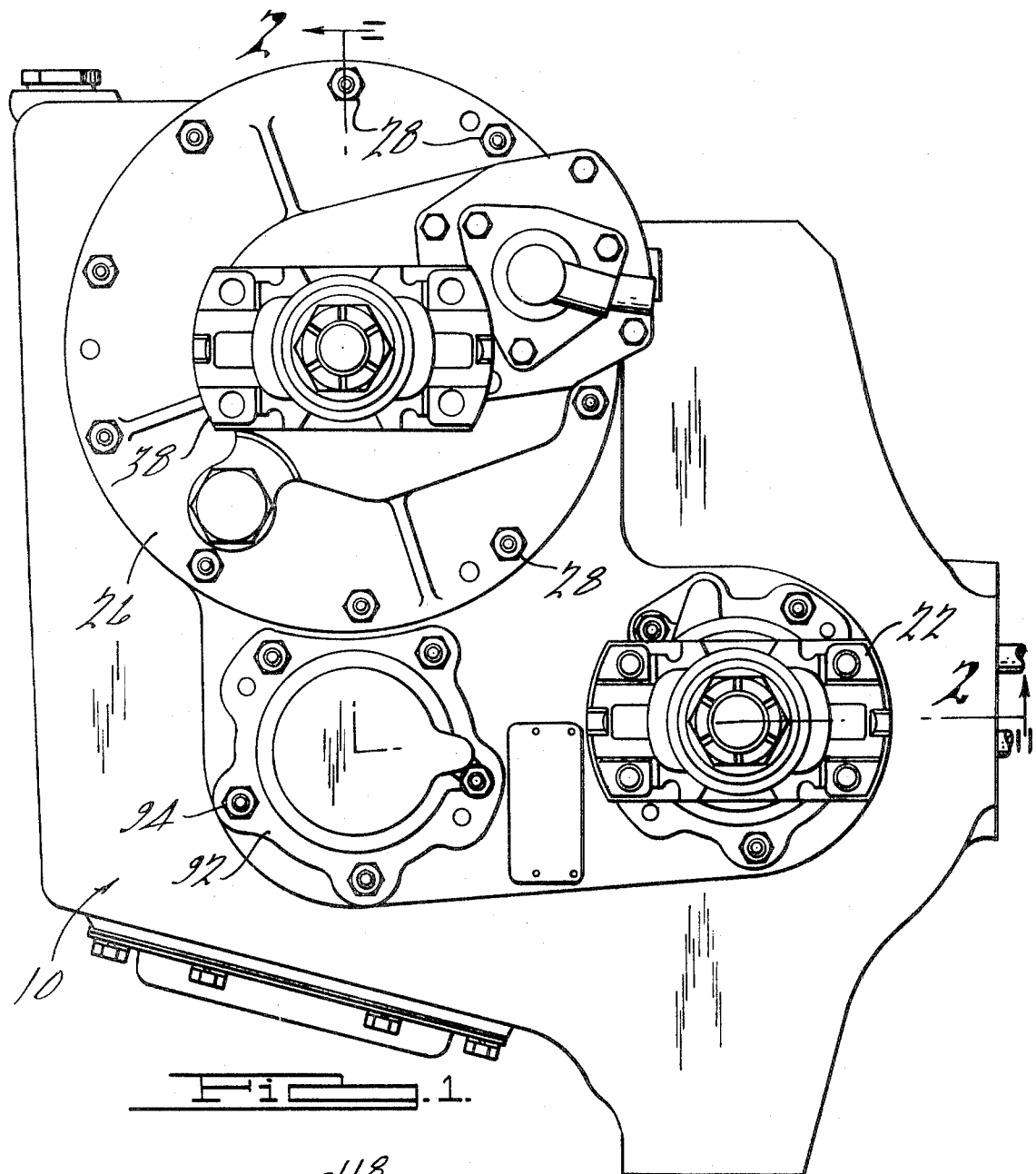
FIG. 1 shows an end elevational view of a torque transfer gearcase having the improvements of my invention.

The torque transfer gearcase includes a housing 10, having aligned bearing openings in each side thereof, as indicated at 12 and 14. These receive bearings 16 and 18, respectively, which journal input shaft 20. A drive shaft yoke 22, seen best in FIG. 1, is connected to the outboard end of the shaft 20. One side of the housing 10 is formed with a large diameter opening 24 over which cover 26 is bolted, bolts 28 being provided for this purpose. Cover 26 includes an extension 30, which is formed at its outboard end with bearing opening 32. A first power output shaft 34 is journaled in the opening 32 by means of a ball bearing assembly 36. Drive shaft yoke 38 is splined to the output shaft 34.

Power input shaft 20, is connected drivably to the driven shaft of a multiple speed ratio power transmission mechanism in a vehicle driveline. Shaft 20 is splined directly to power input gear 40 for the transfer gearcase. This gear in turn meshes with another gear 42, which is journaled by means of tapered roller bearings 44 and 46. Gear 42 meshes with another gear shown in part at 48. This gear is journaled in the housing 20 by tapered roller bearings 50 and 52 received, respectively, in the cover plate 26 and in a corresponding cover plate 58 located on the opposite side of the transmission housing 10. Power output shaft 60 is connected by means of a universal joint yoke 62 to one drive shaft, which extends to a differential mechanism for the rear traction wheels.

Shaft 60 extends in a forward direction and is integrally joined to sleeve 64, which is journaled by bearing 50. Externally splined hub 66 is carried by the sleeve shaft 64. Adjacent the hub 66 is an externally splined clutch element 68 carried by sleeve 70 which, like shaft sleeve 64, is journaled by the bearing 50. The extending portion 72 is disposed between the sleeve shafts 64 and 70.

Output shaft 34 is connected by means of universal joint yoke 38 to another drive shaft that extends to the differential mechanism for the forward traction wheels. An externally splined clutch element 74 is connected to the shaft 34. Clutch elements 74 and 68 are situated directly adjacent the hub 66, and the spline teeth formed on these clutch elements have the same pitch diameter as the teeth on the hub 66.

An internally splined clutch sleeve 76 slidably engages the external teeth of the hub 66. When the sleeve 76 is shifted in a left-hand direction, its internal teeth register with the external teeth of the clutch element 74 thereby locking together the shaft 34 and the hub 66. A second internally splined clutch sleeve 78 also slidably engages the external teeth of the hub 66. It is adapted to be shifted in a right-hand direction so that its internal teeth register with the external teeth of the clutch element 68, thereby establishing a positive driving connection between the hub 66 and the sleeve shaft 70.

When the sleeves 76 and 78 are positioned as shown in FIG. 2, a torque delivery path is established between the shaft 20 and the shaft 60. The torque delivery path is defined by gear 40, gear 42, gear 48, sleeve shaft 70, clutch sleeve 78, hub 66, and finally sleeve portion 64 of the shaft 60.

The right-hand end of the shaft 34 is formed with a reduced diameter, so that it can be disposed as shown in telescopic relationship within the sleeve 64. Portion 80 provides a bearing support for the shaft 34. If the sleeves 76 and 78 are shifted to the position shown in FIG. 4, the driving connection between the hub 66 and the sleeve shaft 70 is released. This corresponds to a neutral condition where the torque delivery path extending from the shaft 20 to the output drivelines 38 and 62 is interrupted. On the other hand, when the clutch sleeves 76 and 78 assume the position shown in FIG. 5, a driving connection between each power output flange 38 and 62 and the sleeve shaft 70 is established. Thus, torque can be delivered from the drive shaft 20 to each of the two drive flanges.

Shifting movement of the sleeve 78 is effected by shift fork 82, and shifting of the clutch sleeve 76 is effected by the shift gear 84. Shift fork 82 is carried by fork hub 86 carried by slidable shift rail 88. One end of the shift rail is received in an opening 90 formed in housing cover 92. This in turn is bolted over access opening formed in the side of the housing 10, suitable bolts 94 being provided for this purpose as seen in FIG. 1. The housing cover includes an extension which carries cover plate 96. Opening 98 in the plate receives the other end of the shift rail 88.

Formed, also, in the extension is an opening 100, which slidably receives piston rod 102 for a servomotor 106. This motor includes a cylinder 108 which slidably receives piston 110 carried by the shaft 102. A pressure chamber is situated on each side of the piston 110, as shown at 112 and 114. Fluid is admitted to and exhausted from the chambers through servo fluid pressure ports, one of which can be seen in FIGS. 4 and 5 at 116.

A collar 118 is connected to the shaft 102 and is held axially fast thereon by any suitably means, such as a setscrew.

The piston rod 102 can be shifted in a right-hand direction by admitting fluid pressure to pressure chamber 112, and it can be returned in the opposite direction by pressurizing chamber 114.

Collar 86 is formed with a boss 120, which is engaged by a finger 122 formed on the collar 118. Collar 86 normally is urged in the left-hand direction by shift spring 124.

Spring 124 tends to urge the fork 82 toward the position shown in FIG. 2, which causes a driving connection between sleeve 70 and hub 66. When fluid pressure is admitted to chamber 112, the shift fork 82 is shifted to the neutral position, as shown in FIG. 4, against the opposing force of the spring 124.

Figure 3:
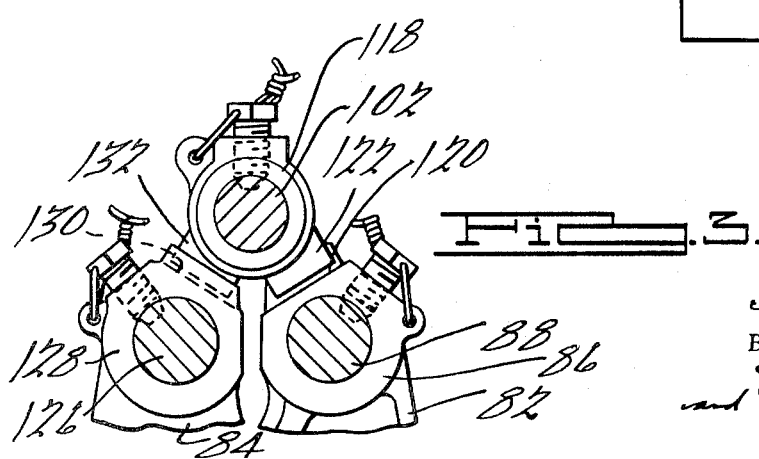
FIG. 3 is a partial cross-sectional view taken along the plane of section line 3-3 of FIG. 2.

As seen in FIG. 3, a second shift rail is provided as shown at 126. This is in parallel disposition with respect to the rail 88. It carries a shift collar 128, which forms a part of the shift fork 84.

Collar 128 is formed with a boss 130, which is adapted to be engaged by finger 132 on the collar 118 when the latter is shifted in a left-hand direction. Collar 128 is urged in a right-hand direction by shift spring 134, as best seen in FIG. 5.

When fluid pressure is admitted to chamber 114, the shift fork 84 is moved in a left-hand direction thereby establishing a driving connection between the drive yoke 38 and the hub 66. When the shift fork 84 is moved in the opposite direction by the spring 134, the clutch sleeve 76 will assume its neutral position, as shown in FIG. 2.

It is possible with this arrangement to effect shifting movement of either clutch sleeves 76 and 78 regardless of the presence of torque on the other clutch sleeve. Clutching action can be established and disestablished for either of the drive shafts without interrupting the torque applied to the other drive shaft. This improved shifting function is accomplished, furthermore, with the use of a single shift linkage and a single actuator lever thereby permitting the use of additional shifting functions without increasing the complexity of the design itself when it is compared to prior art mechanisms.

It is possible to effect a shifting movement of either sleeve to its neutral position following torque delivery through the associated drive shaft without interrupting the torque distribution path extending to the other drive shaft. The same clutch sleeve can be shifted again to a driving position, as explained previously, with the same shifting function.

Having thus described a preferred embodiment of my invention, what I claim and desire to secure by U.S. Letters Patent is:

1. A torque transfer gear case for delivering torque to each of two axle shafts for a wheeled vehicle, said gearcase comprising a housing, a plurality of torque transmitting gears mounted in said housing and adapted to deliver driving torque to said axle shafts, one of said gears being adapted to be connected drivably to a torque input shaft, a pair of torque output shafts, first, second and third clutch elements with external clutch teeth arranged in adjacent coaxial relationship, said second clutch element being disposed between said first and third clutch elements, another of said gears being connected to said first clutch element, one output shaft being connected to said second clutch element and the other output shaft being connected to said third clutch element, a first clutch sleeve with internal clutch teeth mounted slidably on said first clutch element and adapted to engage the external teeth on said second clutch element when it is shifted in one axial direction thereby forming a first driving connection between said first and second clutch element. A second clutch sleeve mounted slidably on said second clutch element and adapted to engage the external teeth on said third clutch element when it is shifted in said one direction thereby establishing a second driving connection between said second and third clutch elements, a pair of shift rails mounted for movement in a direction parallel to the output shafts, a shift fork carried by each shift rail, one shift fork being adapted to register with one clutch sleeve and the other being adapted to register with the other clutch sleeve whereby said clutch sleeves can be shifted axially upon movement of said shift forks, an actuator motor including a piston, an actuator shaft connected to said piston and mounted for movement in a direction parallel to said piston and mounted for movement in a direction parallel to said shift rails, a shift rail interlock member carried by said actuator shaft between said shift rails, said interlock member and each shift fork having registering parts whereby said actuator shaft moves said first clutch sleeve into engagement with said first clutch element upon movement thereof in the other direction said actuator motor being adapted to shift said second clutch sleeve into engagement with said third clutch element when said actuator shaft moves in said one direction, and spring means for normally biasing said first and second clutch sleeves toward said second clutch element.